Aug. 19, 1952 W. C. TRAUTMAN 2,607,600
TEMPERATURE AND VOLUME CONTROL VALVE
Filed July 22, 1946 2 SHEETS—SHEET 1
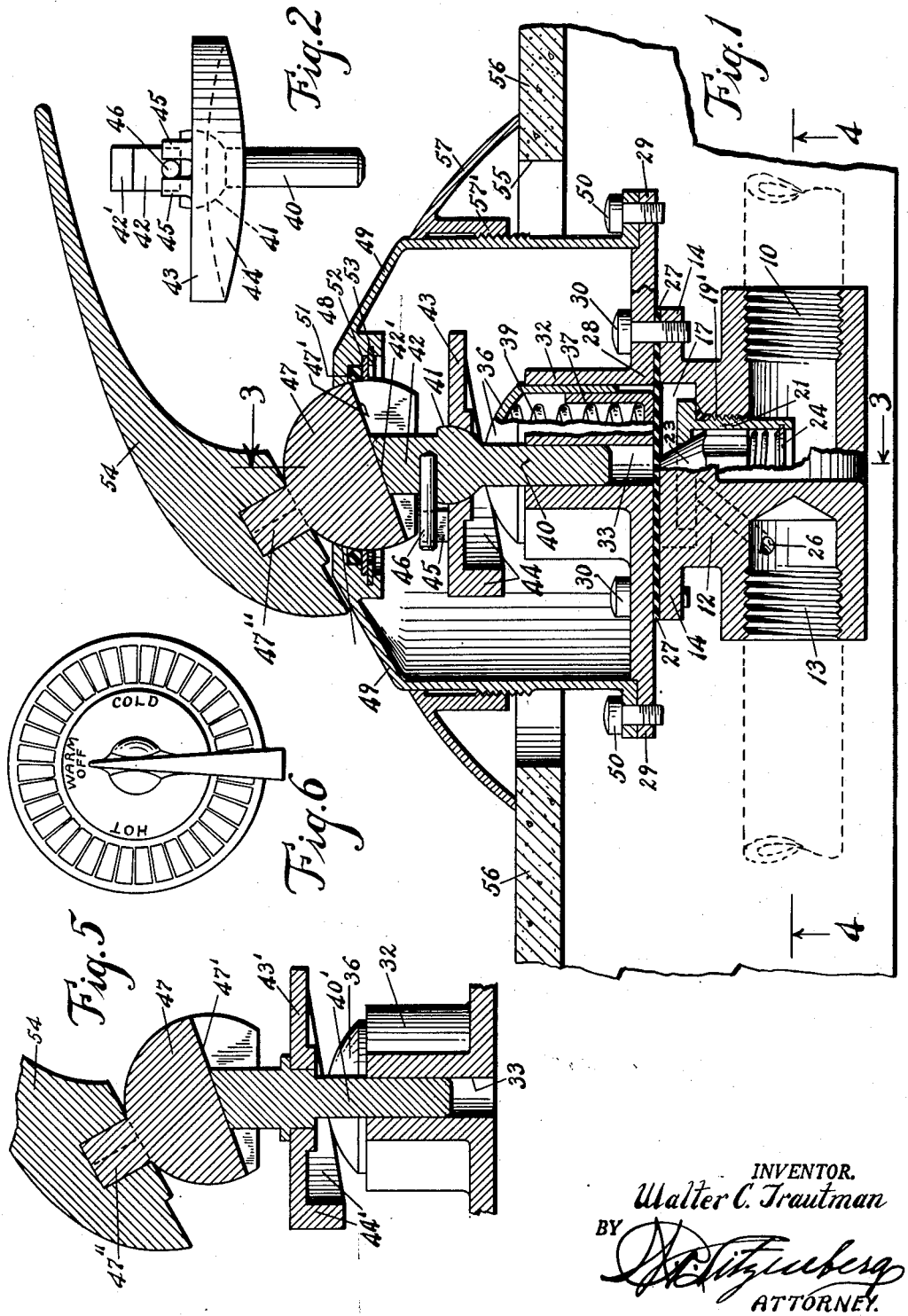
INVENTOR.
Walter C. Trautman
BY
ATTORNEY.

Aug. 19, 1952 W. C. TRAUTMAN 2,607,600
TEMPERATURE AND VOLUME CONTROL VALVE
Filed July 22, 1946 2 SHEETS—SHEET 2
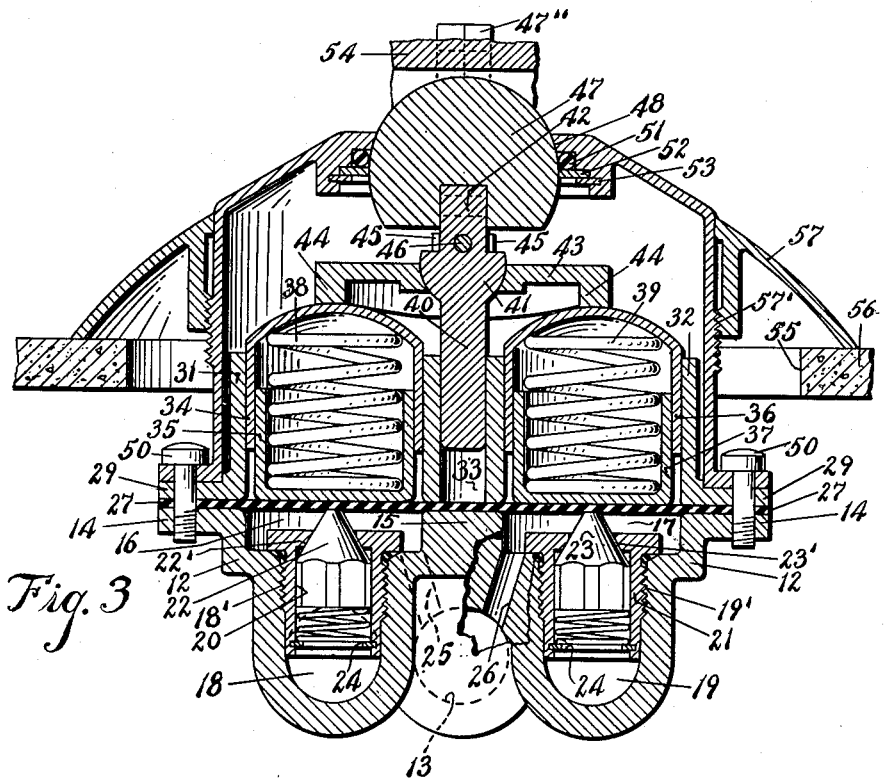
Fig. 3
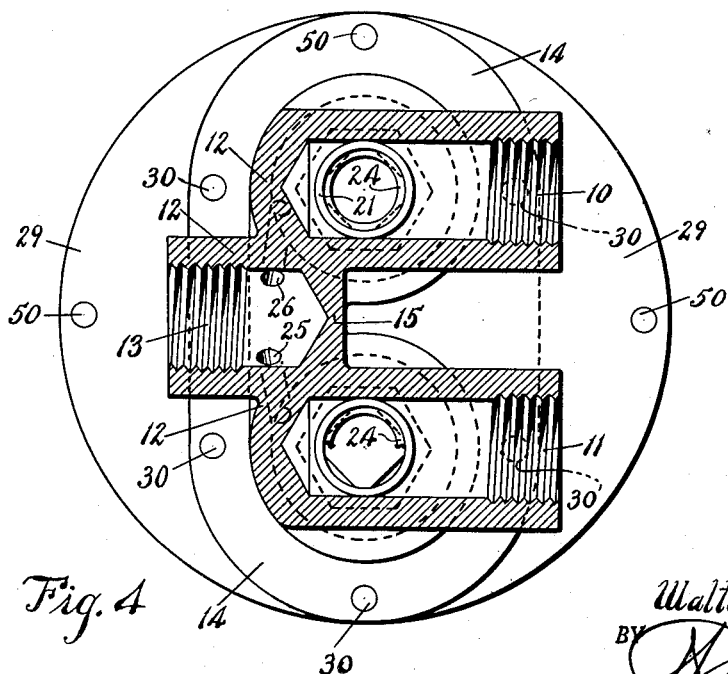
Fig. 4
INVENTOR.
Walter C. Trautman
ATTORNEY.

Patented Aug. 19, 1952

2,607,600

UNITED STATES PATENT OFFICE 2,607,600

TEMPERATURE AND VOLUME CONTROL VALVE

Walter C. Trautman, Los Angeles, Calif.

Application July 22, 1946, Serial No. 685,413

6 Claims. (Cl. 277—20)

This invention relates to temperature and volume control mechanism, and is particularly well adapted for use in controlling the flow and mixing of hot and cold water, whereby a desired temperature at the place of delivery can be had, and it has among its salient objects:

To provide a mechanism of the character referred to wherein a single control member, handle or lever is operable for regulating or controlling both the temperature and the volume of liquid delivered for use;

To provide in such a mechanism means whereby a predetermined or preselected ratio between hot and cold water may be had, thereby making possible a desired blend or mixing thereof, and the temperature of which is automatically maintained irrespective of change in the supply pressure of either hot or cold water;

To provide in connection therewith means whereby a preselected volume flow of the mixture will continue irrespective of changes in the supply pressure of either hot or cold water;

To provide an improved mechanism of the character referred to which can be embodied in means for controlling either the temperature control, or the volume control, with a simple, single handle or lever with its operating connections.

I am aware that many attempts have been made to accomplish the objects and purposes of this invention, but in so doing thermostats of various kinds have been employed, or gas or liquid filled bellows have been used, but none of these methods is wholly satisfactory.

This invention accomplishes the desired objects in a simple, practical and mechanical way, and by means of a single control handle the desired temperature of the mixture can be had, and also the desired volume of flow from the discharge nozzle or faucet, and no matter if change may take place in the supply pressure, the preselected temperature and volume will be maintained.

Other objects and advantages of the invention will be apparent from the following more detailed description of one practical embodiment thereof, and in which:

Figure 1 is a vertical sectional view through a control mechanism embodying my invention;

Figure 2 is a side elevation of a detail, removed;

Figure 3 is a sectional view taken on the line 3—3 of Fig. 1;

Figure 4 is a sectional view taken on the line 4—4 of Fig. 1; and Figure 5 is a sectional view taken through a detail of slightly modified form; and Figure 6 is a front elevation of the mechanism as it appears on a wall.

Referring now in detail to the drawings, the invention as here shown for explanatory purposes, is connected with hot and cold water pipes, designated 10 and 11, in a casting or body 12, and from which also is a discharge connection, designated 13.

The body 12 is formed with an oval shaped flange 14, and with a central solid portion 15, forming two chambers, as 16 and 17, at opposite sides thereof, and below which are two valve chambers, as 18 and 19, threaded at their mouths, as at 18' and 19', to receive two valve-holding members 20 and 21, having two spring pressed poppet valves 22 and 23 therein, seating outwardly in the valve seats 22' and 23', as clearly shown in Figs. 1 and 3. The springs are held in place by inset rings, as 24, 24.

The hot and cold water pipe connections, 10 and 11, connect with said chambers 18 and 19, so that said valves 22 and 23 normally close flow into the two chambers 16 and 17 above the valve-holding members 20 and 21. When said valves 22 and 23 are depressed, flow is permitted from said pipe connections 10 and 11, through chambers 18 and 19, and through said valve seats 22' and 23', into chambers 16 and 17.

From said chambers 16 and 17, respectively, are two orifices 25 and 26, leading to the common discharge connection 13, as seen in Figs. 1, 3 and 4.

Mounted over said body and its oval shaped flange 14, and the central portion 15 thereof, is a diaphragm 27, clamped in place as seen in Figs. 1 and 3, by a body member 28, having a flange 29 overlying the flange 14, and secured in place by the screw bolts 30, 30, and having thereon two open cylindrical members, as 31, 32, directly over the chambers 16 and 17, and axially aligned with the valves 22 and 23, respectively.

Between said members 31 and 32 is formed a smaller cylindrical bore 33, as shown.

Operable in each of said members 31 and 32, is a pair of telescoping plunger cups or members, as 34—35 and 36—37, with coiled springs, as 38 and 39, therein and therebetween, to normally urge them apart within said members 31 and 32, as will be understood from the showing in Fig. 3. Said pairs of members may be referred to as transmitting members for transmitting power to the valves 22 and 23 through the diaphragm 27. The tops of the upper cups or members 34 and 36 are dome shape, while the bottoms of the cups 35 and 37 rest flatwise upon the diaphragm 27, over said valves, as seen in Fig. 3.

It will be understood from the description thus far that the two valves 22 and 23 are to be depressed, or operated through the flexible diaphragm 27, which closes the chambers 16 and 17, and that the diaphragm is depressed or moved through the telescoping cups 34—35 and 36—37 and their springs 38 and 39.

Mounted in the central bore 33 is a plunger or actuating member 40, having a spherical portion as 41, and extended above this portion as a stem 42, shown in Fig. 1 to be tapered on its end, as at 42'.

Mounted on said actuating member 40, at the spherical portion 41 thereof, is a member 43, and having around its under outer edge a tapering flange portion, designated 44, tapering from one side of said member 43 in both directions to its greatest depth as its opposite side, as will be understood from Fig. 1, said flange portion operating upon the dome portions of the members 34 and 36, as indicated. This member 43 may be referred to as a selector member, and is operable to move said transmitting members together or differentially, according to its rotational adjustment, for opening said valves equally or unequally, as the case may be.

On the top of said member 43, are two spaced lugs, as 45, between which operates a pin 46, inserted into the stem part 42 of the member 40, for turning said selector member 43 when said member 40 is turned.

In Fig. 5, a slightly modified construction is indicated, in which the selector member 43' is secured on a straight telescoping actuating member, designated 40' in this view, whereby to turn with said member.

In either form, it will be seen that as said actuating member is depressed, said selector member is also depressed with it upon the domes of the transmitting members 34 and 36, according to the rotational position of the flange portion thereof, whereby one dome member can be depressed more than the other, according to the circumferential adjustment of said selector member. In Fig. 3, its position would indicate an equal depression of both dome members 34 and 36, and an equal depression or opening of the valves 22 and 23.

Operating on the upper, tapered stem end of said member 40, is a ball-like member 47, having a groove or channel cut therein, designated 47' and operatively receiving the tapered upper end of the stem 42, said member 47 having a bearing support at 48, in the top of a housing 49, which is secured around its flanged bottom upon the flange 29, by bolts 50, 50, as seen clearly in Figs. 1 and 3.

The bearing for said ball-like member 47, in the top of said housing 49, in the present showing, includes a friction ring 51, held in place by a metal ring 52, which is in turn held in place by a split spring ring 53, in an annular groove therefor, whereby said ball-like member 47 can be turned in said bearing, or rocked, as may be desired, by means of a single handle, or operating member 54, and will be maintained in the position selected by the friction ring 51.

Said ball-like member 47 has an angle stem 47", adapted to receive an operating handle or member 54, by means of which said member 47 can be rotated in the spherical bearing at 48 to rotate the selector member 43, by the actuating member 40, or rocked to affect the depression of the selector member 43 by the cam action on the tapered stem end of said actuating member 40. Rotation or depression of the selector member 43 can be simultaneously affected because of the independence of these two functions.

As a bath or shower control, said mechanism will be placed, in most cases so that the housing 49 will be extended through an opening 55 in a wall, or floor structure, as 56, Fig. 1. As a finishing cover over said opening, a threaded metal ring, as 57, is shown screwed on to said housing 49, as at 57', with its outer edge resting upon the wall structure 56. Thus only a single handle or operating member 54 is visible in the arrangement as here shown, with said finishing cover 57. In Fig. 6, it is indicated how the operating lever and cover would appear on a wall.

The use and operation

The use and operation of the mechanism described may be briefly stated as follows:

Assuming that the operating handle or lever 54 and the selector member 43 are in the positions indicated, and said handle 54 is depressed, both of the transmitting members 34—35 and 36—37 will be depressed equally and will operate through the diaphragm 27 to open the valves 22 and 23 equally, allowing a mixture of hot and cold water to flow through the inflow pipes 10 and 11, into the chambers 16 and 17, and thence through the orifices 25 and 26 and into the discharge outlet connection at 13, as seen in Fig. 4 and the other views, with the predetermined temperature.

If the handle 54 is turned so as to turn the selector member 43, to move the deeper part of the flange 44 over one of said dome members, 34 or 36, and then if said handle is depressed, it will be evident that one or the other of said members 34 or 36 will be depressed more than the other, and consequently its valve 22 or 23 will be correspondingly depressed and will let through more hot or cold water, as the case may be. Thus by turning the handle, or operating member 54, and then depressing it, the desired mixture of hot and cold water can be had through a single discharge.

As one of said valves, 22 or 23, is depressed in the manner indicated, and liquid is permitted to flow into the control chambers 16 or 17, or both, the back pressure developed in said control chambers acts on the transmitting members 34—35 and 36—37, causing them to react against their coiled springs 38 and 39. These reaction forces will make the moving elements (poppet valves 22 and 23 and transmitting members 35—37) seek a force-balance such that the force in the coiled springs will cause the poppet valves to be opened sufficiently to allow that flow of liquid through the orifices 25 and 26 which will produce a back-pressure in the control chambers just equal to the originally selected force in the coiled springs.

The pressure drop across the orifices is a function of the flow through them and since the downstream side of the orifices is the common discharge connection 13, the upstream pressure of each orifice is a direct measure of the flow in that circuit.

Thus it is the function of moving members 34—36, 35—37, 38—39 and 22—23, to provide the required hot and cold water flows through orifices 25 and 26 that will produce the desired temperature of blended water at 13 by controlling the upstream pressure of the orifices in the control chambers 16 and 17.

Should the water pressure in either inlet 10 or 11 increase or decrease, due to normal pressure fluctuations occasioned by the opening or closing at other valves and faucets in the pumping system, the poppet valves 22 and 23 will throttle or open, respectively, to decrease or increase the pressure in the control chambers 16 and 17 back to that value originally selected.

Also, in the event of a complete failure of water pressure at either inlet port the fluid reaction against the coiled-spring in that particular chamber will drop to zero, allowing the spring to expand and drop its load. Since this also means a decrease in outward reaction against the selector member 43, at its periphery, it follows that the still remaining reaction against 43 from the other chamber will cause the selector member 43 to rock as a beam on the spherical element 41, thereby decreasing the loading and flow of the other chamber.

The proportions of spring-rates, valve-lifts, etc. can be so arranged to affect a complete shut off during this condition, thus preventing the possibility of scalding during the event of a cold water failure.

It will be understood, therefore, that the selection of the mixed water temperature is accomplished by rotating the handle or operating lever 54, and thus rotating the selector member 43. This determines the ratio of the compression of the coiled springs, and also the ratio of the pressure which it is desired to be maintained in the control chambers.

The volume of flow selection is made by subsequently moving the control handle downwardly, causing a further, but equal compression of the coiled springs 38 and 39. Thus the ratio of the spacing of each poppet valve with respect to its seat, in the flowing condition, is controlled by rotary movement of the selector member, and the specific distance of each valve from its seat is controlled by the downward movement of said selector member. When the handle 54 is returned to its normal position, the valves will be closed, shutting off the hot and cold water supply.

I do not limit my invention to the details of construction and arrangement here shown for illustrating one embodiment thereof, realizing that many changes therein can be made, except as I may be limited by the hereto appended claims forming a part of this application.

I claim:

1. A mixing and volume control mechanism for different fluids including a body having separate inlet connections therefor and a discharge connection for the mixed fluids, said body having a control chamber for each of said inlet connections, a flexible wall for each of said control chambers with an orifice connection from each control chamber to said discharge connection, a valve interposed in said body between each inlet connection and its control chamber, each valve having a part extending into its control chamber, and manually operable mechanism including a handle, means between said handle and said valves for yieldingly engaging the parts thereof in said control chamber, said means being adjustable whereby to select and control the pressure in said control chambers and thereby select and control the maximum volume of flow passing through said orifices.

2. A mixing and volume control mechanism for different fluids including a body having separate inlet connections therefor, and a discharge connection for the mixed fluid, said body having a control chamber formed therein for each inlet connection, a flexible wall for each of said control chambers, an orifice connection from each control chamber to said discharge connection, a valve interposed in said body between each inlet connection and its control chamber, each valve having a part extended into its control chamber and bearing on said flexible wall, and manually operable mechanism including a handle, for engaging the part of each of said valves in said control chamber through said flexible wall, a selector member adjustable to differentially and equally close the distance between said mechanism and said valve parts, and a yieldable transmission member between the part of each valve in the control chamber and said selector member.

3. In a mixing and volume control mechanism, a body having two inlet connections each terminating in a control chamber, and a discharge connection with an orifice connection from each control chamber to said discharge connection, a valve seat and valve between each control chamber and its inlet connection normally closing communication from the inlet connection to its control chamber, an operating handle, a selector member adjustable by said handle, and a yieldable force transmitting wall member between said selector member and each of said valves, said selector member being adjustable to vary the length of said force transmission members.

4. In a mixing and volume control mechanism for fluids, a body having two separate inlet connections for fluids and a connection for the discharge of the mixture thereof, said body having two control chambers formed, respectively, between the inlet connections and the discharge connection with communicating orifices from said control chambers to said discharge connection, two valves between said inlet connections and said control chambers, normally closing communication from said inlet connection to said control chambers, a flexible diaphragm forming a wall for each of said control chambers and against which said valves bear within said control chambers, spring-loaded valve operating means contiguous to said diaphragm and said valves with one end thereof responsive to control chamber pressures, means for differentially and equally loading said valve operating means, whereby to control the pressures in said control chambers and thereby control the maximum volume of flow passing through said orifices.

5. In a mixing and volume control mechanism for fluid, a body having two separate inlet connections for fluids and a connection for the discharge of the mixture thereof, said body having two control chambers formed, respectively, between the inlet connections and the discharge connection with communicating restriction orifices from said control chambers to said discharge connection, two valves between said inlet connections and said control chambers, normally closing communication from said inlet connection to said control chambers, a flexible wall for each of said control chambers, yieldable valve operating means with one end thereof disposed within the control chamber, means for differentially and equally compressing said valve operating means, whereby to select and control the pressures in said control chamber and thereby select and control the maximum volume of flow passing through said orifices.

6. In a mixing and volume control mechanism for fluids, a body having two separate inlet connections for fluids and a connection for the discharge of the mixture thereof, said body having two control chambers therein, respectively, between the inlet connections and the discharge connection with fluid-resistance connections between said control chambers and said discharge connection, a flexible wall for each of said control chambers, two valves between said inlet connections and said control chambers, normally closing communication from said inlet connection to said control chambers, each valve having a part extended into its control chamber, and manually operable mechanism including a handle, means between said handle and said valves for yieldingly engaging the parts thereof in said control chamber, said means being adjustable to select any desired ratio of fluids through said valves.

WALTER C. TRAUTMAN.

REFERENCES CITED

The following references are of record in the file of this patent:

UNITED STATES PATENTS

| Number | Name | Date |
|---|---|---|
| 963,221 | Haynes | July 5, 1910 |
| 1,095,003 | Leonard | Apr. 28, 1914 |
| 1,308,829 | Young | July 8, 1919 |
| 1,517,956 | Compton | Dec. 2, 1924 |
| 1,537,210 | Whidden | Feb. 16, 1926 |
| 1,632,450 | Morris | June 14, 1927 |
| 1,875,509 | Shivers | Sept. 6, 1932 |
| 2,075,740 | McKay | Mar. 30, 1937 |
| 2,322,157 | Porter | June 15, 1943 |

FOREIGN PATENTS

| Number | Country | Date |
|---|---|---|
| 164,068 | Germany | Dec. 1, 1933 |